(12) United States Patent
Fujimori (10) Patent No.: US 11,738,924 B2
(45) Date of Patent: Aug. 29, 2023

(54) WRAPPED RICE

(71) Applicant: FUJIMASA CO., LTD., Suwa (JP)

(72) Inventor: Shuichi Fujimori, Suwa (JP)

(73) Assignee: FUJIMASA CO., LTD., Suwa (JP)

(*) Notice: Subject to any disclaimer, the term of this patent is extended or adjusted under 35 U.S.C. 154(b) by 0 days.

(21) Appl. No.: 17/681,208

(22) Filed: Feb. 25, 2022

(65) Prior Publication Data
US 2022/0185555 A1 Jun. 16, 2022

Related U.S. Application Data

(62) Division of application No. 16/084,701, filed as application No. PCT/JP2017/019834 on May 29, 2017, now abandoned.

(30) Foreign Application Priority Data

Aug. 22, 2016 (JP) ................. 2016-161690

(51) Int. Cl.
*B65D 65/12* (2006.01)
*A23L 7/196* (2016.01)
(Continued)

(52) U.S. Cl.
CPC ............... *B65D 65/12* (2013.01); *A23L 7/10* (2016.08); *A23L 7/1965* (2016.08); *A23P 20/20* (2016.08); *A47J 43/20* (2013.01); *B65D 65/10* (2013.01); *B65D 75/5844* (2013.01); *B65D 75/66* (2013.01); *A23V 2002/00* (2013.01); *B65D 2203/12* (2013.01)

(58) Field of Classification Search
CPC ......... B65D 65/12; A23L 7/1965; A47J 43/00
See application file for complete search history.

(56) References Cited

U.S. PATENT DOCUMENTS

| 5,636,495 A | 6/1997 | Weder et al. |
| 6,604,674 B1 | 8/2003 | Bowman |
| (Continued) | | |

FOREIGN PATENT DOCUMENTS

| JP | 2000-118583 A | 4/2000 |
| JP | 2001-10688 A | 1/2001 |
| (Continued) | | |

OTHER PUBLICATIONS

U.S. Appl. No. 16/084,701, filed Sep. 13, 2018.
(Continued)

*Primary Examiner* — Katherine D Leblanc
(74) *Attorney, Agent, or Firm* — Birch, Stewart, Kolasch & Birch, LLP (57) ABSTRACT

A rice wrapper having a rectangular shape is formed into a deformed conical shape having an apex formed by an intermediate part of one long side, the deformed conical shape is formed by: rolling a part forming one corner part located between one short side and the one long side as an inside rolled part in such a way that the one corner part is placed at an intermediate part of the opposite other long side; rolling a part on the other short side over the inside rolled part as an outside rolled part; and fixing the outside rolled part onto the inside rolled part. The rice wrapper has an outer film provided with a first mark for positioning the part on the other short side which is rolled as the outside rolled part when the deformed conical shape is formed.

8 Claims, 12 Drawing Sheets

(51) Int. Cl.
*B65D 65/10* (2006.01)
*A23L 7/10* (2016.01)
*B65D 75/66* (2006.01)
*B65D 75/58* (2006.01)
*A23P 20/20* (2016.01)
*A47J 43/20* (2006.01)

(56) References Cited

U.S. PATENT DOCUMENTS

2006/0054521 A1 3/2006 Tchira
2011/0256270 A1 10/2011 Fujimori

FOREIGN PATENT DOCUMENTS

| JP | 3138850 U | 1/2008 |
| JP | 2014-94017 A | 5/2014 |
| WO | WO 2015/190968 A1 | 12/2015 |

OTHER PUBLICATIONS

Extended European Search Report dated Jun. 28, 2019, for corresponding European Application No. 17843137.5.
International Search Report for PCT/JP2017/019834 dated Jul. 11, 2017.

WRAPPED RICE

CROSS REFERENCE

This application is a Divisional of copending application Ser. No. 16/084,701, filed on Sep. 13, 2018, which is the National Phase under 35 U.S.C. § 371 of International Application No. PCT/JP2017/019834, filed on May 29, 2017, which claims priority under 35 U.S.C. § 119(a) to Application No. 2016-161690, filed in Japan on Aug. 22, 2016, all of which are hereby expressly incorporated by reference into the present application.

TECHNICAL FIELD

The present invention relates to a rice wrapper for wrapping a cooked rice, e.g., shaped rice, sushi rice, formed into a conical shape and a wrapped rice which is wrapped with the rice wrapper.

BACKGROUND ART

A rice wrapper in which a food sheet, e.g., seaweed, is provided between an outer film and inner films, has been known (see Patent Document 1).

The rice wrapper includes the inner films, a cooked rice (e.g., sushi rice) formed into a conical shape is placed on the inner films, and the rice wrapper is rolled over the cooked rice from both sides so that a hand-rolled sushi is produced.

When eating the wrapped sushi, an outer film is divided into two by pulling a separable part provided to the outer film so as to divide the rice wrapper into two sections (the inner films are previously separated), then the films are removed so that the hand-rolled sushi on which a food sheet is wound on the sushi rice can be produced. Therefore, the sushi wound by the dry food sheet can be eaten deliciously.

More specifically, the rice wrapper disclosed in Japanese Laid-open Patent Publication No. 2014-94017 has the following structure.

Namely, the rice wrapper comprises: the outer film being formed into a rectangular shape and having the band-shaped separable part provided over the entire length in a longitudinal direction so as to divide the outer film into two; the two inner films overlapping to the outer film in a state where the inner films are overlapped to each other but end edge parts of thereof are shifted, the inner films respectively having peripheral edge parts which are fixed to the outer film at proper positions; and a food sheet being provided between the outer film and the inner films, and one side section including one side part of the outer film, which is divided by the separable part, and the inner film connected to the one side part of the outer film and the other side section including the other side part of the outer film, which is divided by the separable part, and another inner film connected to the one side part of the outer film are capable of being separated from each other.

SUMMARY OF INVENTION

Technical Problem

However, in the above described conventional rice wrapper, a part forming one corner part located between one short side and one long side must be placed at an intermediate part of the opposite other long side, when the rice wrapper is formed into the conical shape. Further, an outside rolled part must be placed on a prescribed position of an inside rolled part when rolling the outside rolled part over the inside rolled part. It is very difficult to visually accurately position the members, so they will be displaced, and it is also difficult to form the conical shape having a constant apex angle.

The present invention has been invented to solve the above described problems, and an object of the present invention is to provide a rice wrapper which can be easily formed into a deformed conical shape having a constant apex angle and a wrapped rice wrapped with said rice wrapper.

Solution to Problem

The rice wrapper of the present invention comprises: an outer film being formed into a rectangular shape and having a band-shaped separable part provided over the entire length in a longitudinal direction so as to divide the outer film into two; two inner films overlapping to the outer film in a state where the inner films are overlapped to each other, and end edge parts of thereof are shifted, the inner films respectively having peripheral edge parts which are fixed to the outer film at proper positions; and a food sheet being provided between the outer film and the inner films, wherein one side section, which includes one side part of the outer film separated by the separable part and one film of the inner film connected to the one side part of the outer film, is separable from other side section, which includes other side part of the outer film and other film of the inner film connected to the other side part of the outer film, when the outer film is separated by the separable part; wherein one corner part between one short side and one long side of the rice wrapper is positioned on a middle part of other long side, the one corner part is wound as an inner winding part, and a part of other short side of the rice wrapper is wound on the inner winding part as an outer winding part and fixed on the inner winding part, thereby the rice wrapper is formed into a deformed cone shape in which a middle part of the one long side is formed as an apex, and wherein said rice wrapper is characterized in that the outer film is provided with a first mark for positioning the part on the other short side which is rolled as the outside rolled part when the deformed conical shape is formed.

In the rice wrapper, the first mark may be a marking line for positioning a side of the part on the other short side which will be rolled as the outside rolled part.

A second mark may be provided to a part of the other short side, which will be rolled as the outside rolled part, and located at a position corresponding to the first mark.

Further, the mark may be provided so as to make the apex angle within an angular range of 42-50 degrees when the rice wrapper is formed into the deformed conical shape and made flat.

Preferably, when the rice wrapper is formed into the deformed conical shape, the part forming the one corner part located between the one short side and the one long side is rolled as the inside rolled part in such a way that the one corner part is placed at an intermediate part of the opposite other long side and that the one long side is made perpendicular to the other long side, and the part on the other short side is rolled over the inside rolled part as the outside rolled part in such a way that a part of the other long side is overlapped to the one short side.

In the rice wrapper, a covering member may be provided to a bottom part of the deformed conical part formed into the deformed conical shape so as to cover the opened bottom part of the deformed conical part by bending the covering member.

A third mark and a fourth mark for positioning, which are used when bending the covering member to cover the opened bottom part of the deformed conical part and fixing the same to the outer film, may be respectively provided to the covering member and the outer film.

The wrapped rice of the present invention is characterized in that a cooked rice formed into a conical shape is accommodated in the above described rice wrapper which has been formed into the deformed conical shape.

Advantageous Effects of Invention

By employing the present invention, the rice wrapper, which can be easily formed into the deformed conical shape having a constant apex angle, and the wrapped rice, which is wrapped with said rice wrapper, can be provided.

BRIEF DESCRIPTION OF DRAWINGS

FIG. 13 is an explanation view of an embodiment in which the covering member is provided to an end edge part 14a.
FIG. 15 is an explanation view of an embodiment in which the covering member is provided to the end edge part 14a.

DESCRIPTION OF EMBODIMENTS

Preferred embodiments of the present invention will now be described in detail with reference to the attached drawings.

Figure 1:
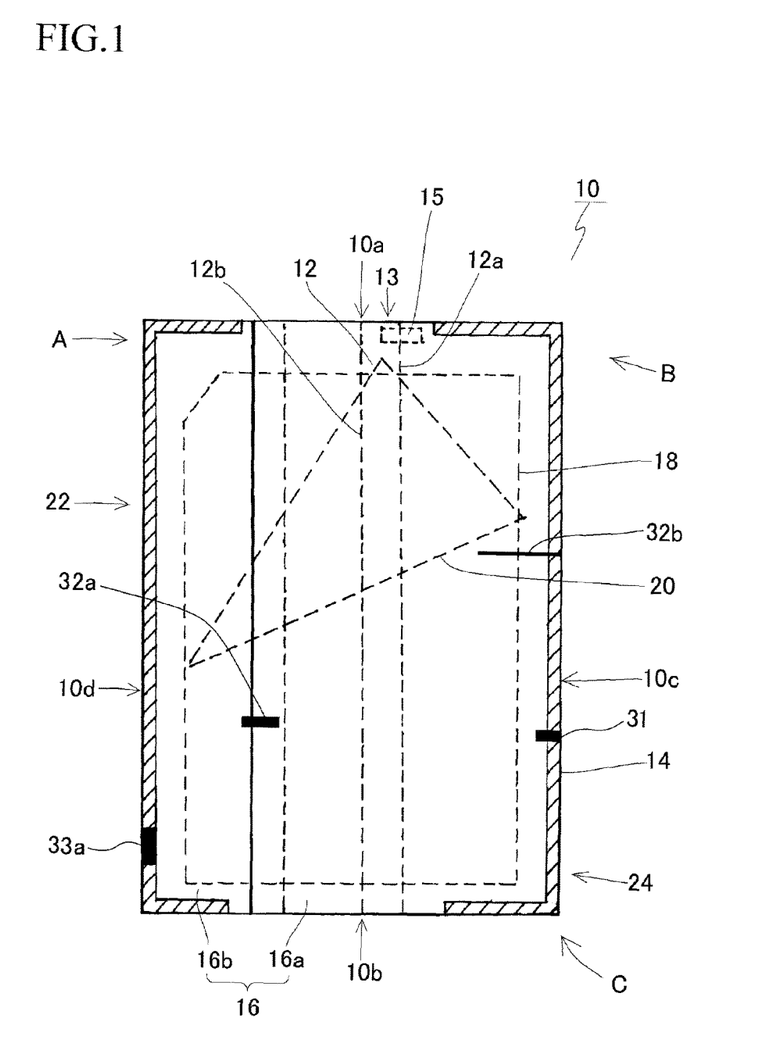
FIG. 1 is an explanation view of an embodiment of the rice wrapper.
Figure 6:
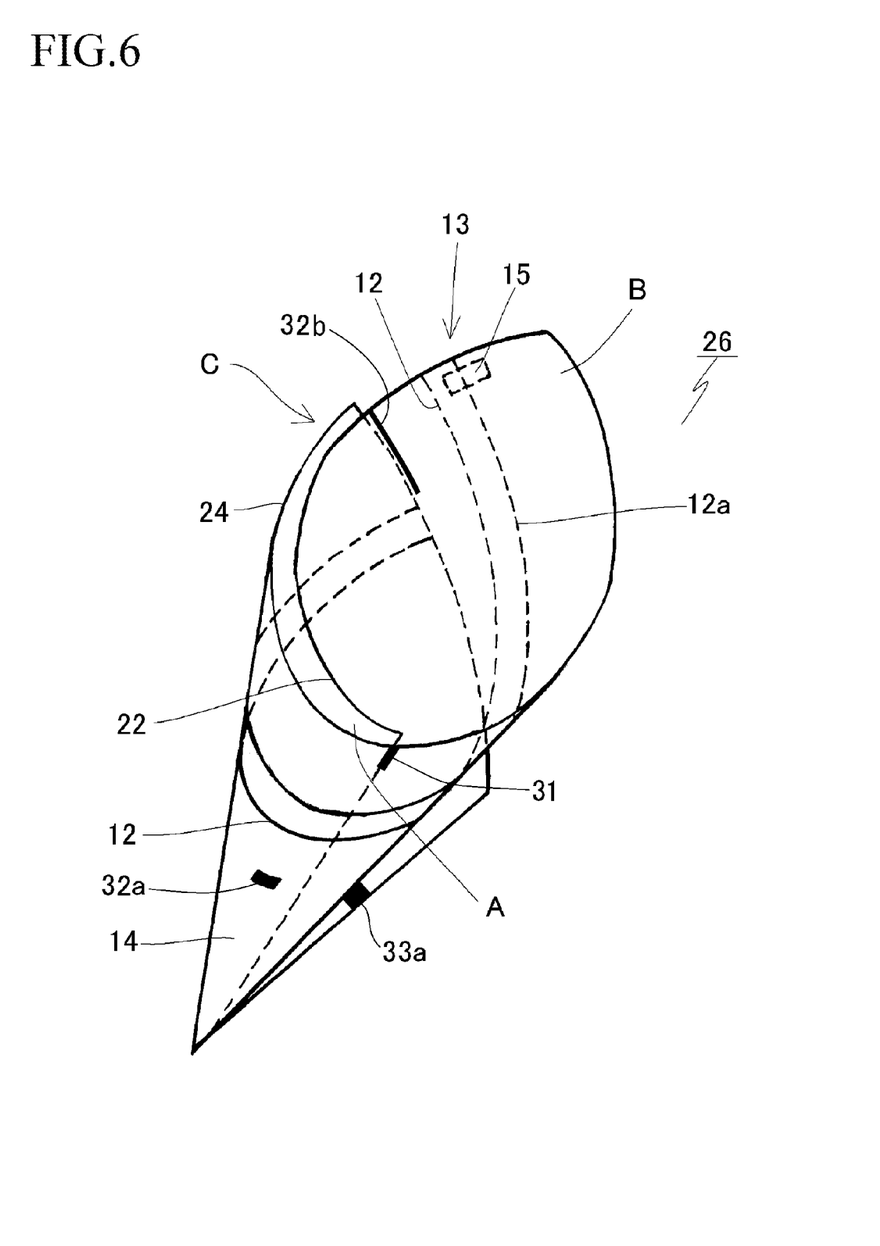
FIG. 6 is an explanation view of a wrapped rice.
Figure 7:
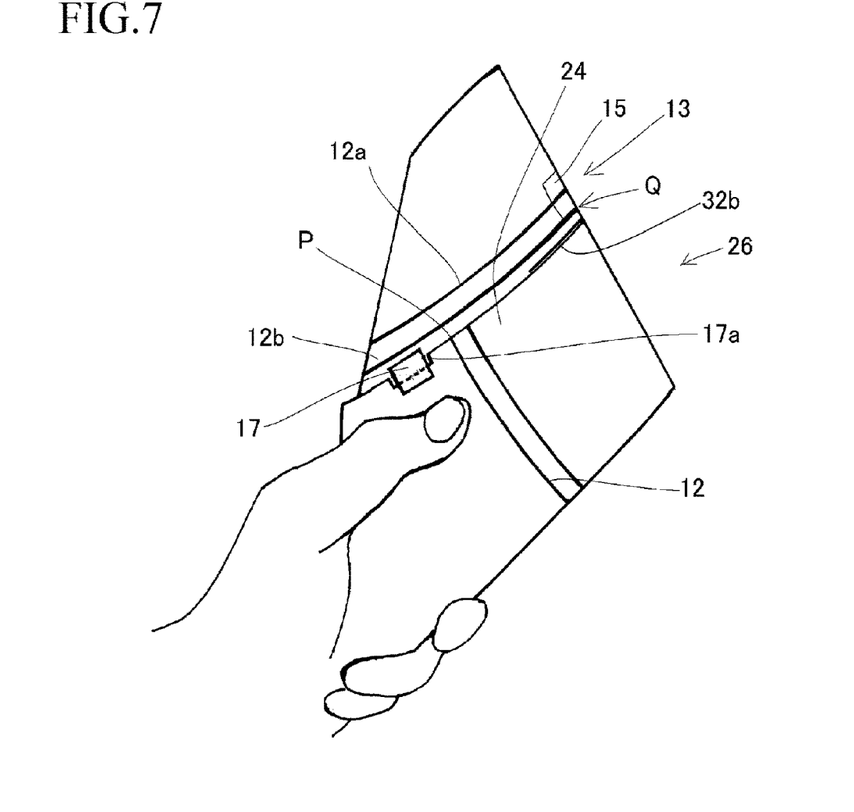
FIG. 7 is an explanation view showing a separation starting position and a separation terminating position of the separable part in a state where the rice wrapper is grasped with a hand.

FIG. 1 is an explanation view of a rice wrapper (hereinafter simply referred to as "wrapper") 10 for wrapping a cooked rice, e.g., shaped rice, sushi rice, and FIGS. 6 and 7 are explanation views of a wrapped rice (hereinafter referred to as "wrapped body") 26. Note that, FIG. 1 shows the wrapper 10 seen from an inner film side.

The wrapper 10 comprises: an outer film 14 being formed into a rectangular shape and having a known band-shaped separable part 12 provided over the entire longitudinal length thereof so as to divide the outer film into two; two inner films 16a and 16b overlapping to the outer film 14 in a state where end edge parts of thereof are overlapped, the inner films respectively having peripheral edge parts which are fixed to the outer film 14, at proper positions, by heat welding; and a food sheet 18, e.g., seaweed, 14, being provided between the outer film 14 and the inner films 16a and 16b. Note that, the rectangular shape includes substantially rectangular shapes, e.g., rectangular shape whose corners are cut.

Figure 2:
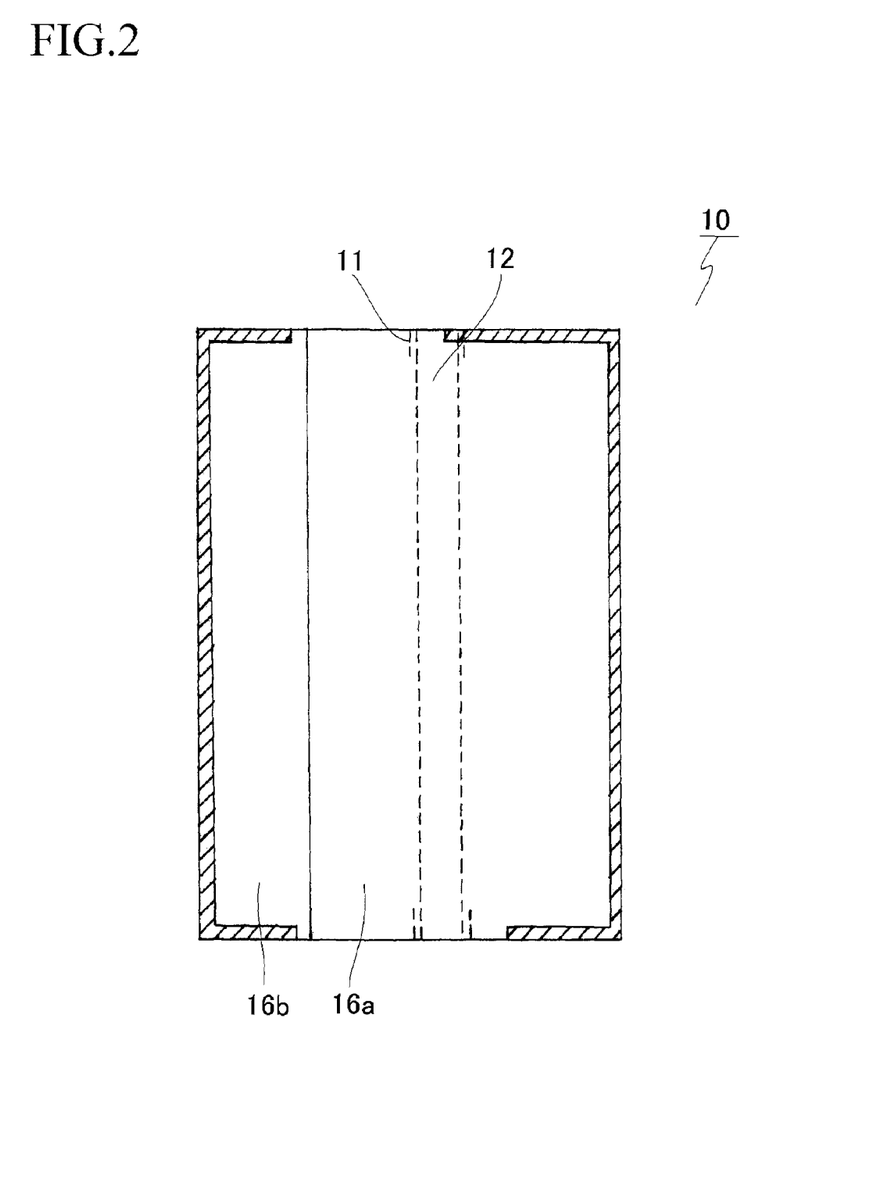
FIG. 2 is an explanation view in which a separable part is constituted by one cut tape.
Figure 3:
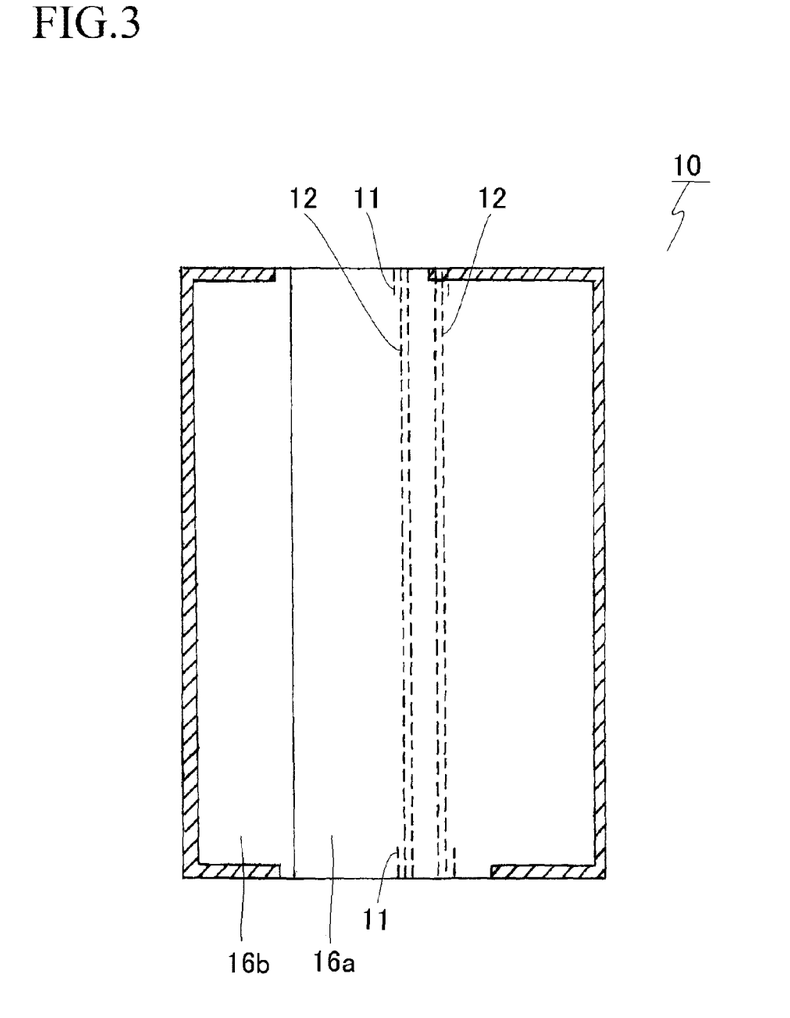
FIG. 3 is an explanation view in which the separable part is constituted by two cut tapes.
Figure 4:
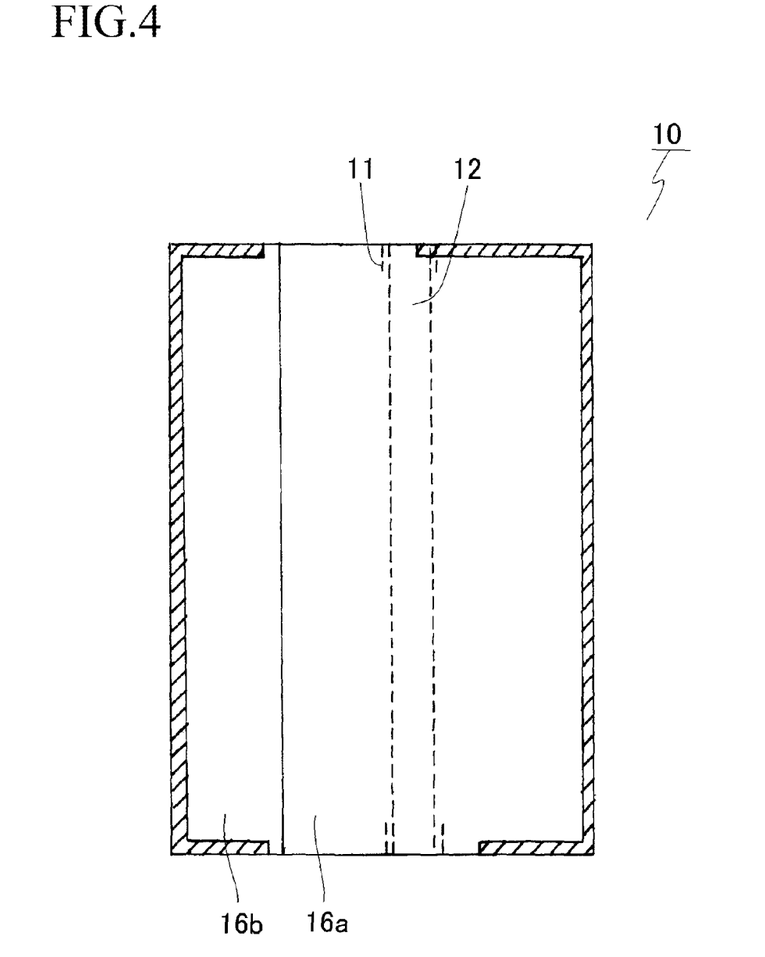
FIG. 4 is an explanation view in which the separable part is constituted by two perforations.

The separable part 12 may be constituted by one cut tape having a prescribed width as shown in FIG. 2, two cut tapes as shown in FIG. 3, two perforations as shown in FIG. 4, etc. Note that, in each of the cases, notches 11 are formed in the outer film 14 on both sides of an end part of the separable part 12 so as to easily start to cut. In the example shown in FIG. 3, the two cut tapes and a part of the outer film therebetween can be cut; and in the example shown in FIG. 4, a part of the outer film between the two perforations can be cut. In an example shown in FIG. 5, the outer film 14 is an oriented film capable of being easily cut in a longitudinal direction, two notches 11 are formed in one end side thereof, and the outer film can be cut (divided) from the notches 11. Further, in an example not shown, the outer film 14 is divided into two, and they are partially heat-welded as the separable part.

The inner films 16 are fixed to the outer film 14 by heat welding.

The heat-welded parts (the parts indicated by hatched lines in FIG. 1) are not limited to the shown example, but the heat-welded parts are located at positions where one side section, which includes one side part of the outer film and the one inner film piece 16b connected to the one side part, and the other side section, which includes the other side part of the outer film and the inner film piece 16a connected to the other side part, are capable of being divided when the outer film 14 is divided into two by the separable part 12. Namely, the heat-welded part, in which the divided one side part of the outer film 14 is connected to the one inner film piece 16b, and the heat-welded part, in which the other side part of the outer film 14 is connected to the other inner film piece 16a, are oppositely located with respect to the separable part 12.

In the present embodiment, a part of the separable part 12 is connected to the other side section, and the other side section can be separated from the one side section at a time by pulling the separable part 12.

Figure 5:
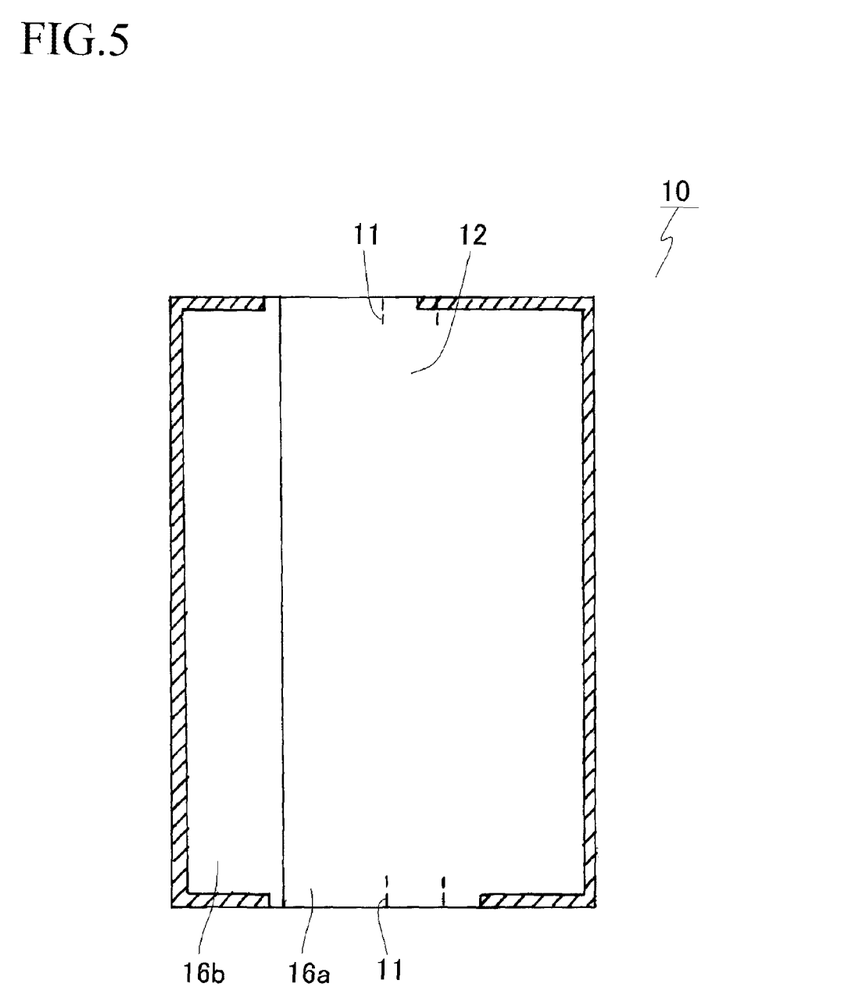
FIG. 5 is an explanation view in which an outer film is an oriented film and the separable part is constituted by two notches.

Concretely, in the present embodiment, an end part of one side edge part 12a of the separable part 12 in the width direction (an end of a separation terminating end side in a cutting direction) is an unseparable part 13, in which the outer film 14 cannot be separated. Note that, in case of using the two cut tapes shown in FIG. 3 or in case of using the two perforations shown in FIG. 4, the one side edge part 12a of the separable part 12 in the width direction is one of the cut tapes or one of the perforations. Further, in case of cutting from the two notches 11 formed in the oriented film as shown in FIG. 5, the one side edge part in the width direction is one of cutting schedule lines.

The other side edge part 12b of the separable part 12a in the width direction is capable of entirely dividing the outer film 14 into two in a longitudinal direction.

To form the unseparable part 13, a fixing tape 15, for example, is adhered from the end part of the one transverse side edge part 12a of the separable part 12 to a part of the outer film 14 located adjacent to the end part. Further, as shown in FIGS. 2-5, the heat-welded parts, which fix the inner films 16 to the outer film 14, may be extended to the end part of the one transverse side edge part 12a of the separable part 12 to form the unseparable part.

A manner for producing a wrapped body 26 (see FIG. 6), e.g., hand-rolled sushi, in which the cooked rice (e.g., sushi rice) 20 is wrapped with the wrapper 10, will be explained.

Firstly, the sushi rice which has been formed into a conical shape is placed on the inner films 16 of the wrapper 10 in such a way that a top part of the rice is directed to the intermediate part of the one long side 10d of the wrapper 10 (a bottom part is directed to a corner part B) and an angle of the sushi rice is about 45 degrees with respect to the wrapper 10 (see FIG. 1).

Next, a triangular part of the wrapper 10 (a part indicated by hatched lines in FIG. 8), whose top is a corner part A located between one short side 10a and the one long side 10d, is rolled along an external surface of the sushi rice 20 as an inside rolled part 22 (see FIG. 6).

Figure 9A:
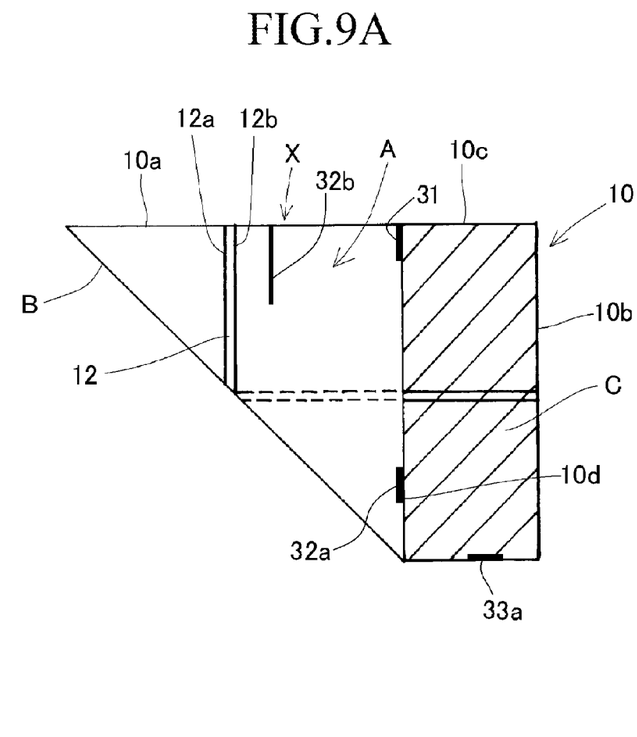
FIGS. 9A and 9B are explanation views of the rice wrapper shown in FIG. 8 in which an inside rolled part is folded back.

Next, a part C of the wrapper 10 (a part indicated by hatched lines in FIG. 9), which has a prescribed width and which is located on the other short side 10b side, is rolled over the inside rolled part 22 as an outside rolled part 24 (see FIGS. 6 and 9A).

Then, the outside rolled part 24 is fixed on the inside rolled part 22 by suitable means, e.g., sealing tape 17 (see FIG. 7), heat welding, so that the wrapped body 26 can be produced. Note that, the sushi rice 20 is omitted in FIG. 6.

As described above, the wrapped body 26 like a hand-rolled sushi, in which the sushi rice formed into the conical shape is accommodated in the wrapper 10 formed into the deformed conical shape, can be produced.

When the wrapper 10 is formed into the deformed conical shape, the separable part 12 of the part of the outer film which becomes the inside rolled part 22 is not covered with the outside rolled part 24 as shown in FIG. 6, so it is suitable to expose the separable part 12 over the entire length of the outer film 14.

As described above, the separable part 12 of the outer film 14 is not covered with the outside rolled part 24 and is exposed over the entire length of the outer film 14, so that the separable part 12 is not interfered by the outside rolled part 24 when dividing the outer film 14 by the separable part 12, the outer film 14 can be easily divided and removed, together with the inner films 16 previously separated, from the sushi rice 20 in a state where the food sheet 18 left on the sushi rice 20.

FIG. 7 shows a separation starting position P of the separable part 12 of the wrapped body 26 grasped with a hand and a separation terminating position Q of the separable part 12, the separable part 12 is exposed over the entire length of the outer film 14, so it is understandable that the wrapped body 26 can be easily grasped and an operation of dividing the outer film 14 can be highly easily performed. Note that, when the outside rolled part 24 is fixed on the inside rolled part 22 by the sealing tape 17, if the sealing tape overlaps (covers) the separable part 12, an end edge part of the outside rolled part 24, to which the sealing tape is adhered, is slightly notched (a notch 17a) and the end edge part is shifted backward so as to prevent the sealing tape 17 from interfering with the separable part 12.

As described above, in the present embodiment, the end part of the one side edge part 12a of the separable part 12 in the width direction (an end of the terminating position side in the cutting direction) is the unseparable part 13 in which the outer film 14 cannot be completely divided into two.

Therefore, when the separable part 12 is pulled from the separation starting position P toward the separation terminating position Q so as to divide the outer film 14, the outer film 14 is not completely divided at the unseparable part 13 of the one side edge part 12a, but the outer film 14 is divided over the entire length along the other side edge part 12b.

As described above, the outer film 14 is divided into two, over the entire length, by the other side edge part 12b of the separable part 12 in the width direction, but the separable part 12 is connected to the one side part of the divided outer film 14 (the upper part of the outer film) by the unseparable part 13. Therefore, by further pulling the separable part 12, the other side section (the bottom part of the deformed conical shape part) including the one side part of the divided outer film 14 connected to the separable part 12 and the one inner film 16a (the upper film) previously connected to the one side part of the outer film can be easily separated (divided) upward from the one side section (the top part of the deformed conical shape part) including the other side part of the divided outer film 14 and the other inner film 16b previously connected to the other side part of the outer film (i.e., the both side sections can be removed in a state where the food sheet 18 is left on the sushi rice 20).

The detail manner for forming the wrapper 10 into the deformed conical shape will be further explained with reference to FIGS. 8-11.

Figure 8:
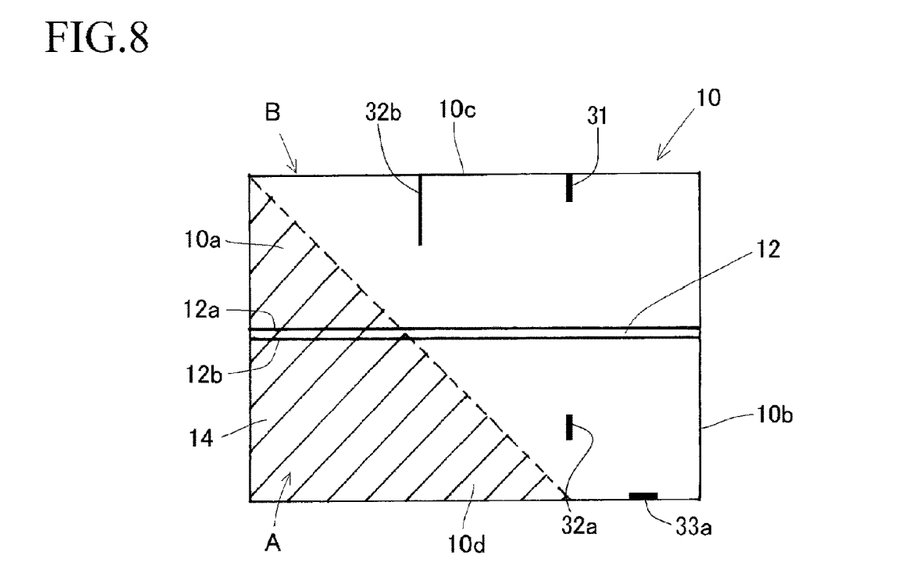
FIG. 8 is an explanation view in which one corner part is indicated by hatched lines.
Figure 9B:
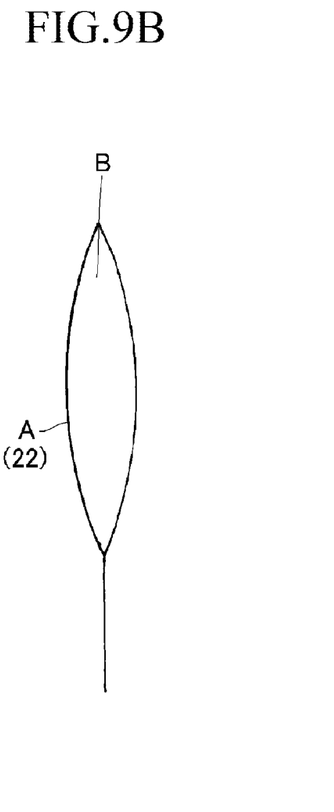

As shown in FIG. 9A, the triangular part (indicated by hatched lines in FIG. 8; the part becomes the inside rolled part) including the one corner A, which is located on the one short side 10a side of the wrapper 10, is folded back (actually, the triangular part is circularly folded along the surface of the sushi rice). Namely, the corner part A is folded back in such a way that a long side (one long side) 10d on the one corner A side is perpendicularly placed with respect to a long side (the other long side) 10c on the other corner side B. At this time, the sushi rice is in a wrapped state, so the short side 10a is not overlapped to the long side 10c actually, but, in case of seen from a direction of FIG. 9A, the both sides look like they are overlapped, so appearance of the wrapped body will be improved. To perpendicularly arrange the one long side 10d with respect to the other long side 10c, it is preferable to provide a spot mark (fifth mark) 31 to a predetermined position on the other long side 10c of the outer film 14, at which the corner part A will be placed, as shown in FIG. 8. FIG. 9B is a view seen from a direction X shown in FIG. 9A. Note that, the mark 31 is not essential.

Figure 10A:
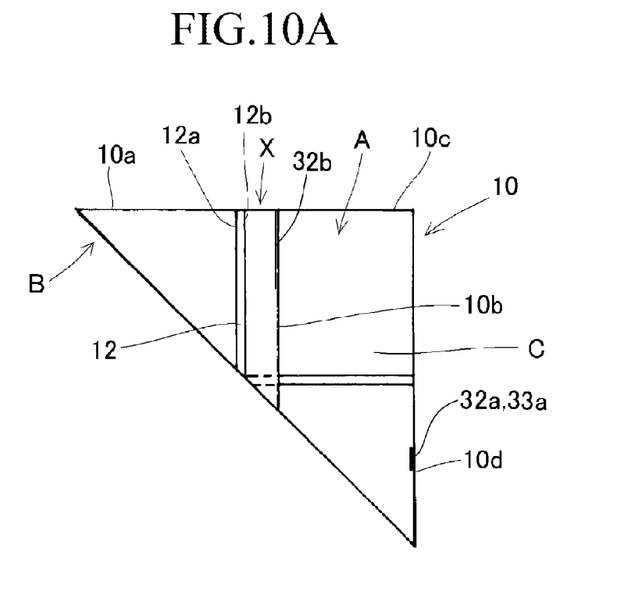
FIGS. 10A and 10B are explanation views in which an outside rolled part is folded back from the state shown in FIG. 9.
Figure 10B:
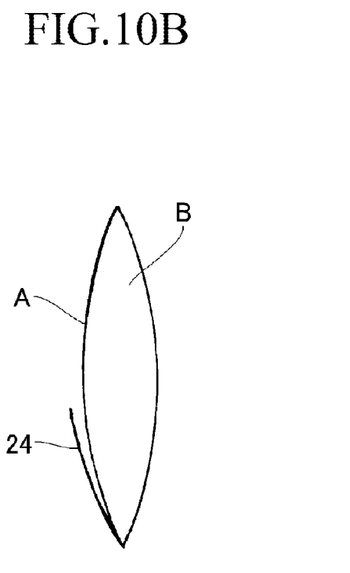
Figure 11:
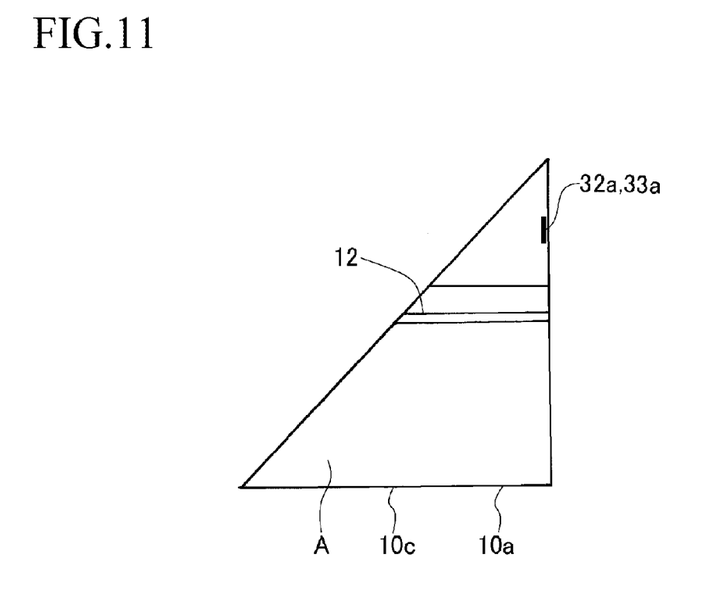
FIG. 11 is an explanation view in which the rice wrapper shown in FIG. 9 is seen from a rear side.

Next, as shown in FIG. 10A, the part of the wrapper 10 (the hatched line part C in FIG. 9A) having a prescribed width and being located on the other short side 10b side of the wrapper 10 is folded, along the long side 10d of the folded part, to overlap onto the corner part A (actually, the triangular part is circularly folded along the surface of the sushi rice), so that the outside rolled part 24 is formed. The part covered with the outside rolled part 24 is the inside rolled part 22. In this case, the long side 10c of the wrapper 10 is overlapped on the one short side 10a (see FIG. 10A), so that the appearance of the wrapped body can be improved. FIG. 10B is a view seen from a direction X shown in FIG. 10A. FIG. 11 is a view in which the wrapper shown in FIGS. 9A and 9B are seen from a rear side.

In the present embodiment, a first mark 32a, which is a spot mark for positioning a part of the other short side 10b to be rolled as the outside rolled part, is provided to a prescribed place in the outer film 14, so that the part of the wrapper 10 (the hatched line part C in FIG. 9A) having a prescribed width and being located on the other short side 10b side of the wrapper 10 can be folded, along the long side 10d of the folded part, and can accurately overlap onto the corner part A.

A second mark 33a, which is a spot mark, is provided close to a part of the other short side 10b and will be coincided with the first mark 32a.

The both marks 32a and 33a are coincided with each other (overlap to each other), and then the hatched line part C is folded.

Note that, the first mark 32a may be a straight marking line, and the hatched line part C may be folded in such a way that the one long side 10d is placed along the straight marking line (in this case the second mark 33a may be omitted).

Further, a marking line 32b for positioning the other short side 10b may be provided to a part of the outer film 14, which will correspond to the other short side 10b in the part to be rolled as the outside rolled part 24 (the hatched line part C), as the first mark 32b. By folding the hatched line part C in such a way that the other short side 10b is placed along the straight marking line 32b, the hatched line part C can be folded at a correct position.

Note that, the both marks 32a and 32b may be provided as the first marks.

The marks 31, 32a, 32b and 33a may be formed on the outer film 14 by suitable means, e.g., printing.

By correctly positioning the corresponding parts in accordance with the first mark 32a and/or the first mark 32b, the top of the corner part A is necessarily corresponded to the fifth mark 31, so the fifth mark 51 is not essential. In other word, the first mark 32a and/or the first mark 32b is provided to such position.

As described above, the wrapper 10 can be formed into the deformed conical shape by rolling the outside rolled part over the inside rolled part and adhering the sealing tape 17 to a suitable position or heat-welding a suitable position.

To easily understand, the wrapper 10 is flatly folded as shown in FIGS. 9-11. Therefore, an apex angle is 45 degrees, but the actual wrapper is formed into the deformed conical shape, so the apex angle will be about 30 degrees.

In case of flatly forming the wrapper, as described above, the preferable apex angle is about 45 degrees so as to improve the external appearance, but the apex angle of the flatly formed wrapper may be within an angle range of 42-50 degrees.

If the apex angle of the flatly formed wrapper is within 42-50 degrees, the one side section and the other side section, which have been divided, can be pulled out, with no difficulty, in a state where the food sheet 18 is left on the wrapped rice, e.g., sushi rice.

If the apex angle of the flatly formed wrapper, which has the deformed conical shape, is more than 50 degrees, actions of pulling the separable part 12 in a transverse direction and a longitudinal direction must be large, so it is difficult to open the wrapped body. On the other hand, if the apex angle of the flatly formed wrapper is less than 42 degrees, an overlapped part of the inside rolled part and the outside rolled part is large, it is difficult to divide the wrapper into the one side section and the other side section.

If the apex angle is other than 45 degrees, the one long side 10d cannot be made perpendicular to the other long side 10c. Further, the other long side 10c cannot overlap to the one short side 10a.

However, in the present embodiment, the wrapper having the flat deformed conical shape, whose apex angle is within the range of 42-50 degrees, can be accurately and easily produced by providing the marks 32a, 32b, 33a, etc. at the predetermined positions.

Successively, it is preferable that the two inner films 16 are a wide film piece 16a and a narrow film piece 16b which is narrower than the wide film piece 16a as shown in FIG. 1-5. In this case, it is preferable that the narrow film piece 16b is placed on the long side 10d side of the wrapper 10, so that the divided films can be easily removed from the cooked rice, e.g., shaped rice, sushi rice, as described later. Note that, in the overlapped part of the inner film pieces 16a and 16b, any one of the film pieces may be located inside or outside. Further, one or both of the film pieces in the overlapped part may be further folded (not shown).

Further, a corner of the food sheet 18 located close to the corner part A may be cut as shown in FIG. 1. By cutting the corner, the film pieces can be easily pulled out, without being engaged with the food sheet 18, when the divided films are pulled out from the cooked rice, e.g., shaped rice, sushi rice, as described later.

As described above, the inner films 16 are the wide film piece 16a and the narrow film piece 16b, so that an upper part of the outer film 14 (a part including the corner part B, see FIG. 6) and the wide film piece 16a of the inner films 16, which is fixed to the upper part, can be upwardly pulled out in the state where the food sheet 18 is left on the sushi rice 20, when the outer film 14 is divided into two by the separable part 12. Since the wide film piece 16a of the inner films 16 is wide, a resistance between the film piece and the sushi rice 20 is increased and the film piece is hardly pulled out, but the film piece is upwardly pulled out in an open space, so even if the food sheet 18 exists, the separable part 12 can be easily pulled out by pulling the separable part upward, without being interfered with the food sheet 18.

A width of the food sheet 18 is reduced toward the bottom part, so a lower part of the divided outer film 14 and the narrow film piece 16b of the inner films 16, which is fixed to the lower part, are hardly pulled out downward, but the narrow film piece 16b of the inner films 16 is made narrow, so the film piece can be easily peeled from the sushi rice 20 and easily pulled out.

Especially, if a part of the narrow film piece 16b, which corresponds to a part of the short side 10a in the corner part A shown in FIG. 1, is not heat-welded to the outer film 14 and/or the corner of the food sheet 18 close to said part is cut, the divided films can be further easily pulled out downward.

To easily understand, in the above described embodiment, the wrapped body 26 is produced by rolling the wrapper 10 over the conical-shaped sushi rice 20. However, in actual case of producing the wrapped body 26, it is preferable that the wrapper 10 is previously formed into the deformed conical shape shown in FIG. 6, then the sushi rice 20, which has been formed into the conical shape, is dropped into the wrapper 10, which has been formed into the deformed conical shape, to produce the wrapped body 26. By this manner, the wrapped bodies can be automatically produced by continuously feeding the wrapper 10, which have been formed into the deformed conical shape, to an automatic production apparatus (not shown) and sequentially dropping pieces of the sushi rice, which have been formed into the conical shape, into the wrappers 10.

The wrappers 10 may be previously formed into the deformed conical shape by hands or an apparatus, it is preferable that the above described marks 31, 32a and 32b are provided so as to accurately position each of the parts, so that the deformed conical shape can be accurately formed.

Figure 12:
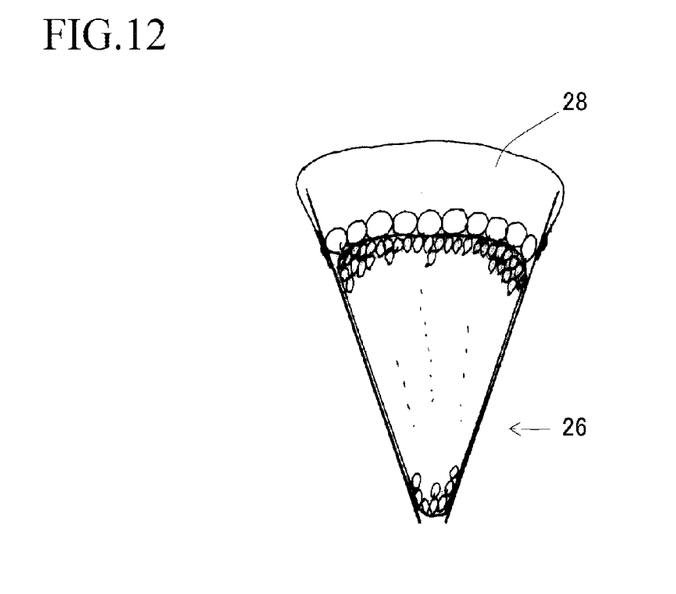
FIG. 12 is an explanation view in which a covering member is provided.

In an embodiment shown in FIG. 12, the wrapped body 26 is covered with a transparent covering member 28 so as to cover an exposed part of the sushi rice 20 (an opened bottom part of the conical shape).

Figure 13:
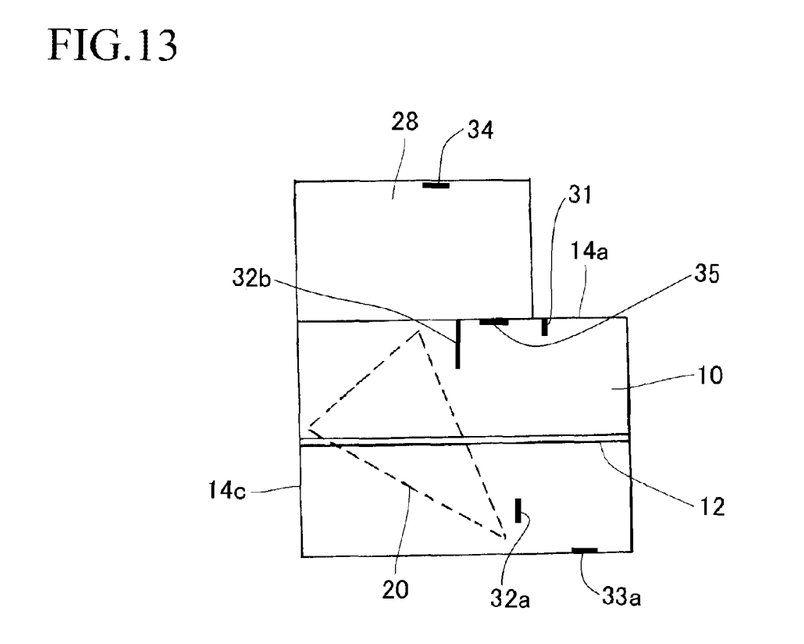
Figure 14:
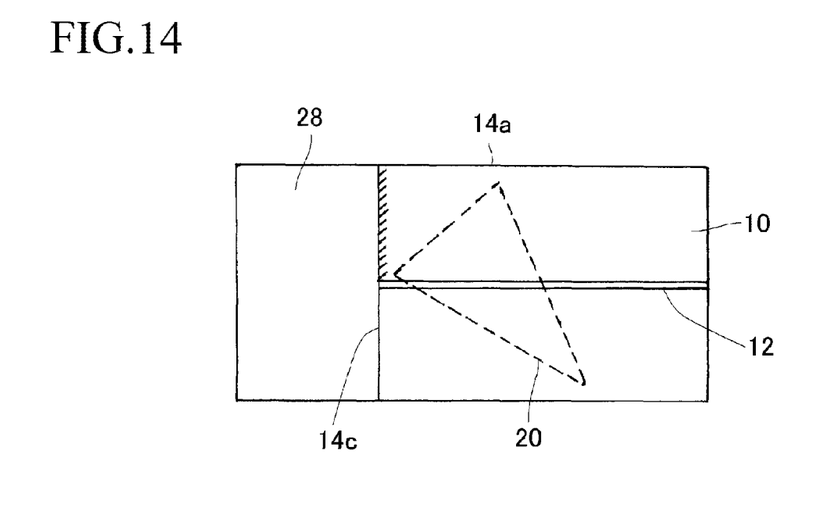
FIG. 14 is an explanation view of an embodiment in which the covering member is provided to an end edge part 14c.
Figure 15:
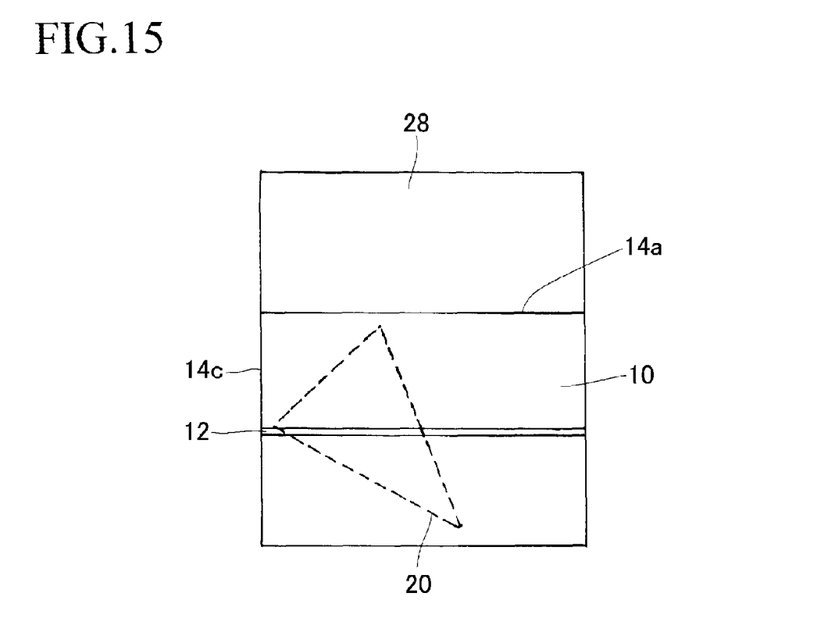
Figure 16:
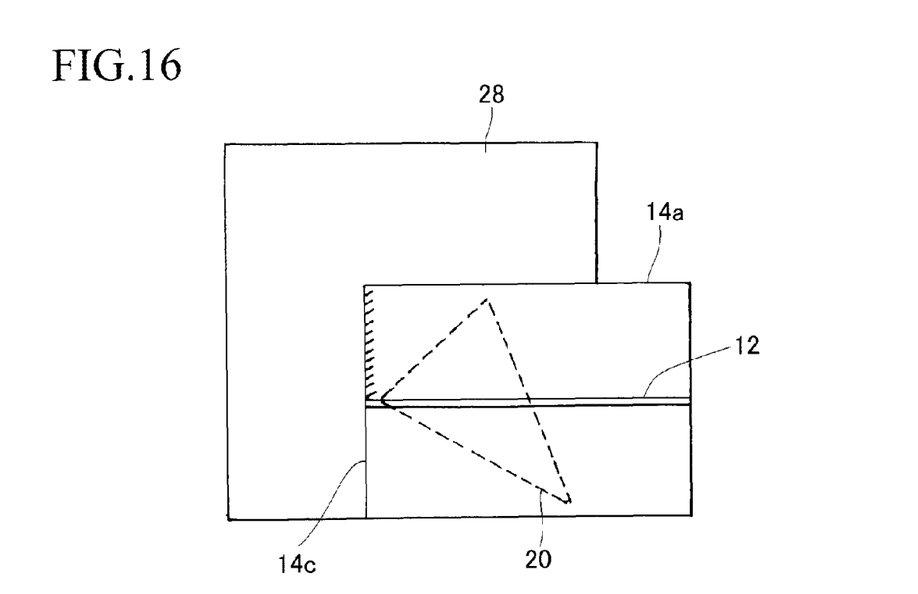
FIG. 16 is an explanation view of an embodiment in which the covering member is provided to the end edge parts 14a and 14c.
Figure 17:
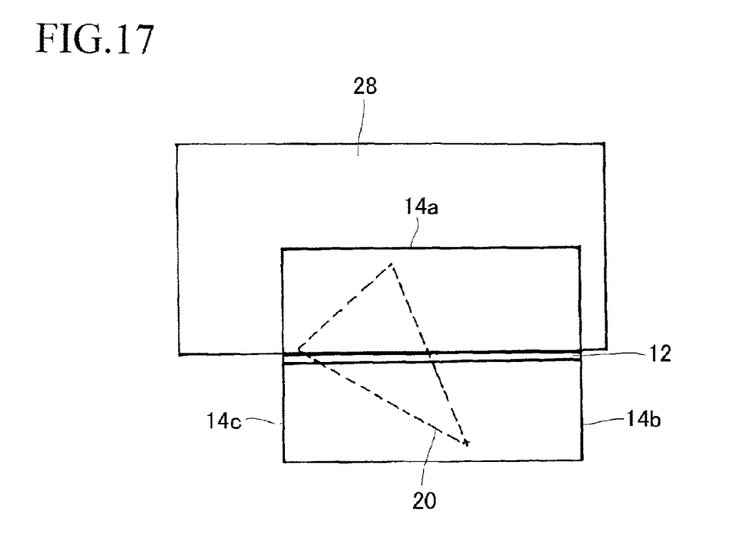
FIG. 17 is an explanation view of an embodiment in which the covering member is provided to the end edge parts 14a, 14b and 14c.

In each of embodiments shown in FIGS. 13 and 15, the covering member 14 is provided to the one end edge part 14a of the outer film 14; in an embodiment shown in FIG. 14, the covering member 28 is provided to an end edge part 14c, which is adjacent to the one end edge part 14a; in an embodiment shown in FIG. 16, the covering member 28 is connected to the both end edge parts 14a and 14c; and in an embodiment shown in FIG. 17, the covering member 28 is connected to the both end edge parts 14a, 14b and 14c.

Namely, the covering member 28 is provided to a part constituting a bottom side of the deformed conical part of the wrapper so that the opened bottom part of the deformed conical part can be covered.

Figure 18:
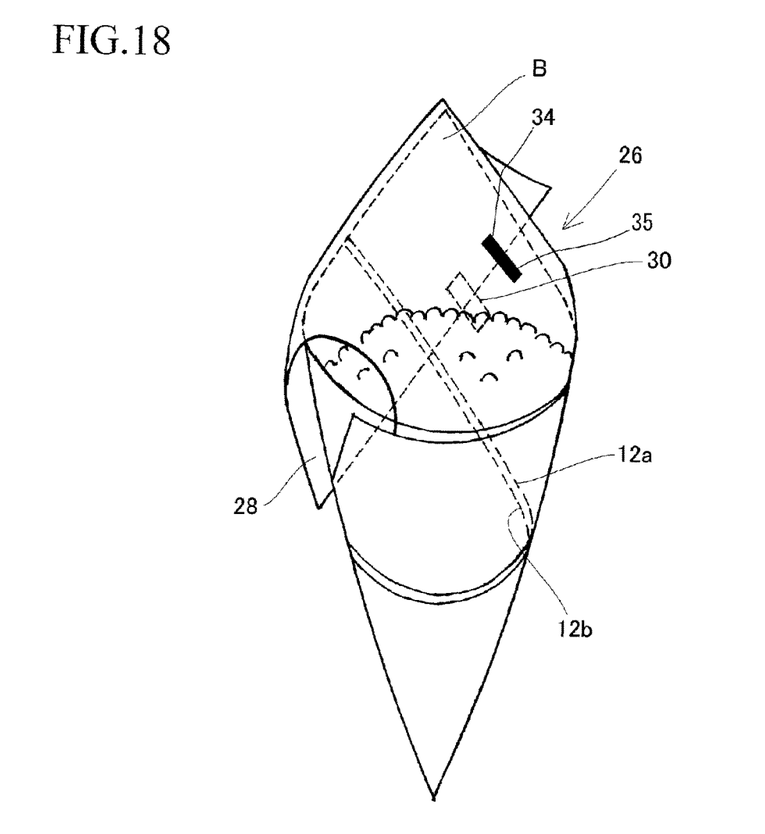
FIG. 18 is an explanation view showing a position of a fixing seal for fixing the covering member.

FIG. 18 shows a position of a fixing seal 30, which is used when the covering member 28 is fixed to the outer film 14 by the fixing seal 30.

In this case, as shown in FIG. 18, it is preferable that a third positioning mark 34 and a fourth positioning mark 35, which are used when the covering member 28 is bent to cover the opened bottom part of the deformed conical part and fixed to the outer film 14, are respectively provided to the covering member 28 and the outer film 14.

What is claimed is:

1. A wrapped rice comprising:
   a cooked rice formed into a conical shape;
   an outer film being formed into a rectangular shape and having a band-shaped separable part provided over the entire length in a longitudinal direction so as to divide the outer film into two;
   two inner films overlapping to the outer film in a state where the inner films are overlapped to each other, and end edge parts thereof are shifted, the inner films respectively having peripheral edge parts which are fixed to the outer film at predetermined positions; and
   a food sheet being provided between the outer film and the inner films,
   wherein one side section, which includes one side part of the outer film separated by the band-shaped separable part and one film of the inner film connected to the one side part of the outer film, is separable from an other side section, which includes an other side part of the outer film and an other film of the inner film connected to the other side part of the outer film, when the outer film is separated by the band-shaped separable part;
   wherein one corner part between one short side and one long side of the rice wrapper is positioned on a middle part of other long side, the one corner part is wound as an inner winding part, and a part of an other short side of the rice wrapper is wound on the inner winding part as an outer winding part and fixed on the inner winding part, thereby the rice wrapper is formed into a deformed conical shape in which a middle part of the one long side is formed as an apex,
   wherein said rice wrapper outer film is provided with a first mark for positioning the part on the other short side which is rolled as an outside rolled part when the deformed conical shape is formed,
   wherein a second mark is provided to a part of the other short side, which will be rolled as the outside rolled part, and located at a position corresponding to the first mark, and
   wherein the first mark and the second mark correspond to each other to form a deformed conical shape to be capable of accommodating the cooked rice formed into the conical shape,
   wherein said first and second marks are provided so as to make the apex angle within an angular range of 42-50 degrees when the rice wrapper is formed into the deformed conical shape and made flat.

2. The wrapped rice according to claim 1, wherein the first mark is a marking line for positioning a side of the part on the other short side which will be rolled as the outside rolled part.

3. The wrapped rice according to claim 1, wherein when the rice wrapper is formed into the deformed conical shape, the part forming the one corner part located between the one short side and the one long side is rolled as an inside rolled part in such a way that the one corner part is placed at an intermediate part of an opposite other long side and that the one long side is made perpendicular to the other long side, and the part on the other short side is rolled over the inside rolled part as the outside rolled part in such a way that a part of the other long side is overlapped to the one short side.

4. The wrapped rice according to claim 1, wherein a covering member is provided to a bottom part of the deformed conical part formed into the deformed conical shape so as to cover the opened bottom part of the deformed conical part by bending the covering member.

5. The wrapped rice according to claim 4, wherein a third mark and a fourth mark for positioning, which are used when bending the covering member to cover the opened bottom part of the deformed conical part and fixing the same to the outer film, are respectively provided to the covering member and the outer film.

6. The wrapped rice according to claim 2, wherein when the rice wrapper is formed into the deformed conical shape, the part forming the one corner part located between the one short side and the one long side is rolled as an inside rolled part in such a way that the one corner part is placed at an intermediate part of an opposite other long side and that the one long side is made perpendicular to the other long side, and the part on the other short side is rolled over the inside rolled part as the outside rolled part in such a way that a part of the other long side is overlapped to the one short side.

7. The wrapped rice according to claim 2, wherein a covering member is provided to a bottom part of the deformed conical part formed into the deformed conical shape so as to cover the opened bottom part of the deformed conical part by bending the covering member.

8. The wrapped rice according to claim 3, wherein a covering member is provided to a bottom part of the deformed conical part formed into the deformed conical shape so as to cover the opened bottom part of the deformed conical part by bending the covering member.

* * * * *